Patented Jan. 6, 1953

2,624,723

UNITED STATES PATENT OFFICE 2,624,723

LACTONE DERIVATIVES AND METHOD OF MAKING

William J. McGraw, Morristown, N. J., assignor to Allied Chemical & Dye Corporation, New York, N. Y., a corporation of New York No Drawing. Application March 3, 1947, Serial No. 732,133

14 Claims. (Cl. 260—88.3)

This invention relates to new products and methods of making and using them. It relates particularly to the manufacturer of lactone derivatives suitable for a variety of uses.

In the past it has been proposed to prepare a substituted lactone by condensation of butyrolactone with alpha-pyridine carboxylic acid ethyl ester. The resulting product is a pyridoyl butyrolactone ($C_{10}H_9O_3N$) having the acyl group joined to the alpha carbon of the lactone structure. As far as I am aware, this product has never been practically utilized.

It is an object of the present invention to prepare novel alpha-substituted lactones. A further object of the invention is to prepare lactone derivatives suitable for manufacture of polymers and for use in resin compositions as polymers, copolymers or modifiers. A further object is to prepare resins of various properties and particularly resins characterized by notable hardness. A further object of the invention is to provide new lactone derivatives having valuable properties as bacteriostatic agents and intermediates for the manufacture of other compounds. Further objects of the invention will be apparent from the following general description and specific examples.

The products of the invention comprise both monomers and the polymers derived therefrom. The monomeric products of the invention are the gamma and delta lactones devoid of ring substituents other than hydrocarbon substituents except in alpha position and containing, as the sole alpha substituent, the group

wherein R represents a hydrogen atom or a lower alkyl radical.

As ring substituents, one or more hydrocarbon radicals may be present in beta, gamma or delta position or in any two or all three of these positions and one such hydrocarbon radical may unite with two of the carbon atoms in the ring to form a fused ring structure. Examples of suitable ring substituents are methyl, ethyl, and phenyl. An example of a fused ring structure is the lactone of orthohydroxy-phenyl acetic acid.

The monomeric compounds of the invention are useful as bacteriostatic agents, solvents, and intermediates for the manufacture of condensation and polymerization products. They are useful in the manufacture of resinous polymers and may be copolymerized with other polymerizable compounds, such as acrylonitrile, acrylic acid esters, styrene, butadiene, and the like, to form a variety of polymeric materials varying from oils to hard amorphous solids. The alpha-methylene-lactone homopolymers and copolymers in particular are useful in the plastic arts for the manufacture of fibers, films, molding compounds, low-pressure laminating resins and other plastic products.

The manufacture of lactones is a well-known type of chemical operation. In some cases lactones suitable for preparing the products of the invention result when preparation of the corresponding gamma or delta hydroxy acids is attempted. In other cases they are obtainable by conventional lactonization of the corresponding gamma hydroxy and delta hydroxy acids. Examples of acids in these two categories are the hypothetical acids, gamma - hydroxy - butyric, gamma and delta-hydroxy-valeric, and gamma-hydroxy-gamma-methyl-valeric, which may be isolated in the form of salts; as well as acids, such as ortho-hydroxy-phenyl-acetic acid, which may be isolated in the form of the free acids.

From lactones of the described type having two hydrogen atoms in alpha position, alpha-acyl derivatives may be prepared by the Claisen condensation and equivalent methods; for example, by reaction of the lactone with an organic acid ester in the presence of metallic sodium. These alpha acyl derivatives may be isolated before further treatment or may be used directly, without separation from the reaction mixture, to produce the compounds of the invention.

One method of making the monomeric compounds of the invention comprises hydrogenation of alpha-acyl lactones, which produces the alpha-CHROH derivatives, and subsequent dehydration of these derivatives, which forms the alpha=CHR derivatives.

The hydrogenation may be effected by means of molecular hydrogen and a hydrogenation catalyst such as nickel, platinum, and other commonly used hydrogenation catalysts. The dehydration may be carried out in any suitable manner, but in making the monomers it is preferred to conduct this step in vapor phase at atmospheric pressure using a dehydrating agent which does not promote polymerization.

A particularly interesting and valuable group of compounds within the purview of the invention is obtained when the alpha-acyl derivative is made by means of a formic acid ester. This provides alpha-formyl lactones from which the methylol and methylene derivatives are obtained progressively by the hydrogenation and dehydration. The alpha-methylene derivatives polymerize especially readily in the presence of peroxide or other per compound catalysts or upon exposure to ultraviolet light; polymerization may be effected by conventional emulsion polymerization methods, or any other method commonly used for the polymerization of monomers.

Substituted derivatives may be obtained employing other fatty acid esters to produce homologs (e. g. ethyl acetate yields the alpha-acetyl compound from which the corresponding hydroxy and ethylidene derivatives may be made).

The following examples further illustrate the invention. In the examples, quantities are expressed in parts by weight unless otherwise indicated.

EXAMPLE 1

*Alpha-methylene-gamma-valerolactone*

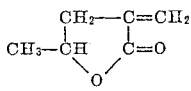

PART 1.—PREPARATION OF ALPHA-FORMYL-GAMMA-VALEROLACTONE

About 1.2 parts of absolute ethanol was added to a suspension of 11.5 parts of granulated sodium (sand) in about 360 parts of dry ether. A mixture of 37 parts of ethyl formate and 50.0 parts of valerolactone was then added gradually over a period of 1½ hours with agitation. A thick yellow sludge formed in the reaction mixture. Sufficient water was added to dissolve this sludge and the aqueous phase was then separated from the ether layer, acidified with hydrochloric acid and extracted with about 400 parts of ether. The ether layer and the ether extract were combined. The ether was then vaporized and the residue was distilled at reduced pressure. About 36 parts of alpha-formyl-gamma valerolactone boiling at 86° to 88° C. at 1 mm. absolute pressure was obtained. The product gradually solidified on standing at room temperature. The product recrystallized from a benzene petroleum ether mixture had a melting point of 68° to 72° C. and boiled at 86° to 88° C. at 1 mm. absolute pressure. It was soluble in water and an aqueous solution yielded a purplish pink color characteristic of enols when treated with ferric chloride solution. It formed a 2,4-dinitro phenylhydrazone of melting point 164.5° to 165° C. Duplicate analyses showed: Carbon 55.9%, 56.2%—hydrogen 6.5%, 6.3%.

PART 2.—PREPARATION OF ALPHA-METHYLOL-GAMMA-VALEROLACTONE 11.9 parts of alpha-formyl-gamma-valerolactone obtained as described in Part 1 was dissolved in 40 parts of absolute ethanol containing 0.5 part of Raney nickel hydrogenation catalyst and heated at 100° C. at 100 atmospheres hydrogen pressure for 10 to 15 minutes. The reaction product was filtered from the catalyst and introduced into a glass still. Alcohol was distilled off and the remaining mixture was further distilled at reduced pressure. 9.6 parts of alpha-methylol-gamma-valerolactone boiling at approximately 102° to 104° C. at 1 mm. pressure was obtained as distillate. The product was readily soluble in water. The following constants were observed: Refractive index, $n_D^{20}=1.4625$; density $$d\ 20/20=1.158$$

molecular refraction 31.4. It formed a 3,5-dinitrobenzoate of 127° to 128° C. melting point. Duplicate analyses showed: Carbon 55.5%, 55.8%—hydrogen 7.4%, 7.2%.

PART 3.—PREPARATION OF ALPHA-METHLYENE-GAMMA-VALEROLACTONE 50 parts of alpha-methylol-gamma-valerolactone obtained as described in Part 2 was heated to a temperature of 260° to 280° C. and the resulting vapor was passed over activated alumina maintained at 340° to 350° C. The vaporous product was cooled to room temperature and absorbed in ether. The ether solution was dried over calcium sulfate and ether was vaporized off. The residue was distilled under reduced pressure in the presence of about 1 to 2% of tertiary butyl catechol which was added to prevent polymerization. 15 parts of alpha-methylene-gamma-valerolactone, a colorless liquid boiling at 77° to 79° C. at 8 mm. pressure, was obtained, refractive index $n_D^{20}=1.4572$; Analyses: carbon 64.1%, 64.5%; hydrogen 7.2%, 7.3%. The product was slightly soluble in water.

EXAMPLE 2

*Alpha-methylene-gamma-butyrolactone*

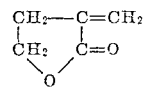

PART 1.—PREPARATION OF ALPHA-FORMYL-GAMMA-BUTYRLACTONE

The procedure of Example 1, Part 1, was repeated substituting 43 parts of gamma-butyrolactone for the valerolactone employed in Example 1. 21.8 parts of alpha-formyl-gamma-butyrolactone boiling at 83° to 85° C. at 1 mm. absolute pressure was obtained. This product gradually solidified to form a water-soluble solid giving a purple color with ferric chloride. Analyses: Carbon 52.8%, 52.6%; hydrogen 5.3%, 5.5%.

PART 2.—PREPARATION OF ALPHA-METHYLOL-GAMMA-BUTYROLACTONE

The alpha-formyl-gamma-butyrolactone product of Part 1 was hydrogenated in ethanol solution containing nickel catalyst as described in Example 1. The alcohol was evaporated off from the product and the alpha-methylol-gamma-butyrolactone boiling at 110° to 112° C. at 1 mm. absolute pressure was obtained by distillation. The product was a colorless viscous liquid readily soluble in water. Its constants were: Refractive index, $n_D^{20}=1.4700$; density, $d\ 20/20=1.2353$; molecular refraction, 26.2. Analysis: Carbon 51.9%, hydrogen 6.97%. Its 3,5-dinitrobenzoate had a melting point of 123° C.

PART 3.—PREPARATION OF ALPHA-METHYLENE-GAMMA-BUTYROLACTONE 60 parts of alpha-methylol-gamma-butyrolactone, prepared as described in Part 1, was heated to 280° to 300° C. and the resulting vapor was passed over activated alumina maintained at 340° to 350° C. The product was absorbed in ether as described in Example 1, Part 3. The ether solution was dried, ether was removed as in Example 1, and the residue was distilled at reduced pressure. 25.3 parts of alpha-methylene-gamma-butyrolactone, a colorless liquid boiling at 85° to 86° C. at 10 mm. absolute pressure (48° to 49° C. at 0.45 mm.), was obtained as distillate. It was slightly soluble in water. Its physical constants were: $n_D^{20}=1.4650$; $d\ 20/20=1.1193$; molecular refraction 24.2. Analyses: Carbon 60.9%, 61.7%; hydrogen 6.4%, 6.3%.

The following examples illustrate the manufacture of resinous polymers from alpha-methylene-gamma-lactone monomers.

EXAMPLE 3

Alpha-methylene-gamma-valerolactone, prepared as described in Example 1, was mixed with 0.15 part of acetyl peroxide dissolved in 0.35 part of dibutyl phthalate. The mixture was placed in a mold and maintained at 60° to 75° C. for 24 hours. The product was a clear, hard, transparent resin.

EXAMPLE 4

The procedure of Example 3 was repeated using alpha - methylene - gamma - butyrolactone prepared as described in Example 2 in place of the gamma-valerolactone. The product was a hard, clear, transparent resin similar in properties to that prepared in Example 3.

EXAMPLE 5

Alpha-methylene-gamma-valerolactone and alpha - methylene - gamma - butyrolactone, prepared in Examples 1 and 2, were placed in molds and maintained at room temperature while subjected to ultraviolet light from a mercury vapor arc for a period of 12 to 24 hours. The products were hard, clear, resinous substances similar in properties to those of Examples 3 and 4.

EXAMPLE 6

The homopolymer of alpha - methylene-gamma-butyrolactone was prepared by solution polymerization in the following manner:

25 parts of alpha-methylene-gamma butyrolactone, 0.38 part and 0.12 part of synthetic detergent materials known, respectively, as Igepon and Nacconol were added to 112 parts of water and the mixture heated to boiling. 0.2 part of a solution containing 30 parts hydrogen peroxide in 100 parts of water was added to the boiling mixture and boiling was continued for 22 hours. At the end of this time, the polymer had precipitated as a soft, curdy, white solid which was filtered, washed with water and methanol and dried. Yield 11.2 grams.

The product was a thermoplastic resin which melted at 230° to 240° C.

The polymeric material prepared as described was ground to a powdered form and 20 to 25 grams was introduced into the cavity of a mold. The mold containing the polymeric material was then subjected to gradually increasing heat and pressure in a hydraulic press until a thin film of the material began to emerge from the crevices around the edge of the mold cavity. The pressure was then released, the mold cooled and the molded material in the form of a bar 5" long and approximately ½" in cross section was removed. The bars were very hard, transparent, brittle materials having a slight yellow color.

EXAMPLE 7

A copolymer of alpha-methylene-gamma-butyrolactone and acrylonitrile was prepared in the following manner:

20 parts of alpha-methylene-gamma butyrolactone, 80 parts of acrylonitrile, 3 parts of potassium persulfate and 1.15 parts sodium bisulfite were added to 1100 parts of water at room temperature. The mixture was stirred vigorously for five hours without heating, during which time the temperature rose spontaneously to 39° C. and then began to decrease. The product precipitated as a white powder which was filtered, washed with water and methanol and dried. Yield 63 grams.

The polymer was molded as described in Example 6. A very hard, transparent bar having a slight yellowish color was obtained.

I claim:

1. As a new chemical compound, a member of the group consisting of the gamma and delta lactones devoid of ring substituents other than hydrocarbon substituents except in alpha position and containing, as the sole alpha substituent, the group =CHR, wherein R represents a member of the group consisting of hydrogen and lower alkyl radicals.

2. As a new chemical compound, a member of the group consisting of the gamma and delta lactones devoid of ring substituents other than hydrocarbon substituents except in alpha position and containing, as the sole alpha substituent, the methylene group =CH₂.

3. As a new compound, alpha-methylene-gamma-butyrolactone,

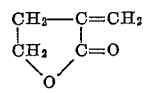

4. As a new compound, alpha-methylene-gamma-valerolactone,

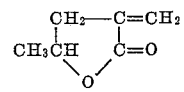

5. A plastic composition comprising a polymerization product of a lactone of the group defined in claim 2.

6. A plastic composition comprising a polymerization product of alpha-methylene-gamma-butyrolactone.

7. A plastic composition comprising a polymerization product of alpha-methylene-gamma-valerolactone.

8. In the manufacture of novel lactone derivatives containing a lower alkylidenyl group in alpha position, the process which comprises hydrogenating a lactone of the group consisting of alpha-lower-acyl gamma and delta lactones devoid of ring substituents other than hydrocarbon substituents, except in alpha position, and containing as the sole alpha substituent the acyl radical

wherein R represents a member of the group consisting of hydrogen and lower alkyl radicals.

9. The method of making a methylene lactone, which comprises hydrogenating a lactone of the group consisting of alpha-formyl gamma and delta lactones devoid of ring substituents other than hydrocarbon substituents, except in alpha position, and containing the aforesaid formyl group as the sole alpha substituent, and subjecting the resulting alpha-methylol lactone to dehydration in vapor phase in contact with a non-condensing dehydration catalyst.

10. The method of making alpha-methylene-gamma-butylrolactone, which comprises catalytically hydrogenating alpha-formyl-gamma-butyrolactone and subjecting the resulting alpha-methylol-gamma-butyrolactone to dehydration in vapor phase at atmospheric pressure in the presence of a non-condensing dehydrating agent.

11. The method of making alpha-methylene-gamma-valerolactone, which comprises catalytically hydrogenating alpha-formyl-gamma-valerolactone and dehydrating the resulting alpha-methylol-gamma-valerolactone in vapor phase at atmospheric pressure in the presence of a non-condensing dehydrating agent.

12. The method of making polymerization products, which comprises heating a lactone of the group defined in claim 2 with a per-compound polymerization catalyst.

13. A plastic composition comprising the product of copolymerization of a polymerizable unsaturated monomer and an alpha-alkylidenyl lactone of the group defined by claim 1.

14. A plastic composition comprising the product of copolymerization of a polymerizable unsaturated monomer and a lactone of the group defined by claim 2.

WILLIAM J. McGRAW.

REFERENCES CITED

The following references are of record in the file of this patent:

UNITED STATES PATENTS

| Number | Name | Date |
|---|---|---|
| 2,382,640 | Kenyon et al. | Aug. 14, 1945 |
| 2,428,015 | Daniels et al. | Sept. 30, 1947 |
| 2,443,827 | Johnson | June 22, 1948 |

FOREIGN PATENTS

| Number | Country | Date |
|---|---|---|
| 883,764 | France | Mar. 29, 1943 |

OTHER REFERENCES

Cavallito et al.: Journal of American Chemical Society, vol. 68, 1946, pp. 2332-2334.

Annalen der Chemie (1889-90), (Bd. 255-56), pp. 314-322.

Bredt: Annalen de Chemie, Bd. 256 (1889-90), pp. 314-322.